United States Patent [19]

Sabol et al.

[11] Patent Number: 5,245,963
[45] Date of Patent: Sep. 21, 1993

[54] DEVICE TO ENHANCE COMBUSTION EFFICIENCY IN AN INTERNAL COMBUSTION ENGINE

[76] Inventors: Alexander P. Sabol, Rte. 7 Box 194 Wiggins Rd., Louisburg, N.C. 27549; Albert Sabol, 120 Ranklewood Dr., Statesboro, Calif. 30458

[21] Appl. No.: 924,951

[22] Filed: Aug. 5, 1992

[51] Int. Cl.⁵ .............................................. F02B 19/00
[52] U.S. Cl. .................................... 123/266; 123/169 C
[58] Field of Search ............... 123/266, 263, 292, 274, 123/260, 169 C, 264, 268, 267, 262, 285, 169 A, 169 C

[56] References Cited

U.S. PATENT DOCUMENTS

| | | | |
|---|---|---|---|
| 1,359,591 | 11/1920 | Grimes | 123/266 |
| 1,522,551 | 1/1925 | Shepard | 123/266 |
| 2,197,106 | 4/1940 | Kammer | 123/292 |
| 2,646,782 | 7/1953 | Fisher | 123/169 C |
| 3,710,764 | 1/1973 | Jozlin | 123/292 |
| 4,182,281 | 1/1980 | Heintzelman | 123/266 |
| 4,324,211 | 4/1982 | Strong et al. | 123/292 |
| 4,499,399 | 2/1985 | Flores | 313/143 |
| 4,532,899 | 8/1985 | Lorts | 123/292 |
| 4,892,070 | 1/1990 | Kuhnert | 123/274 |
| 4,926,818 | 5/1980 | Oppenheim et al. | 123/266 |
| 4,987,868 | 1/1991 | Richardson | 123/260 |
| 5,105,780 | 4/1992 | Richardson | 123/263 |

FOREIGN PATENT DOCUMENTS

| | | | |
|---|---|---|---|
| 3025896 | 2/1982 | Fed. Rep. of Germany | 123/266 |
| 446247 | 3/1949 | Italy | 123/266 |

*Primary Examiner*—Raymond A. Nelli
*Attorney, Agent, or Firm*—Norman B. Rainer

[57] ABSTRACT

A device for improving the thermal efficiency of an internal combustion engine by incorporating a hot gas jet ignition system and a burned gas purge system. The hot, high velocity gas jet generated by the system promotes rapid combustion and helps to insure better combustion of the fuel-air mixture. The invention accomplishes this by providing a spark plug or spark plug/adapter assembly with a mini-combustion chamber having an outlet nozzle. As the engine cycles into and through the combustion phase of operation, a hot, high velocity gaseous jet issues from the mini-combustion chamber and penetrates deep into the combustion chamber of the engine to ignite the main fuel-air mixture. The burned gases in the mini-combustion chamber are than purged by ambient air flow through an air inlet check valve communicating with the mini-combustion chamber during the next intake phase of the associated internal combustion engine cylinder or combustion chamber.

8 Claims, 1 Drawing Sheet

DEVICE TO ENHANCE COMBUSTION EFFICIENCY IN AN INTERNAL COMBUSTION ENGINE

BACKGROUND OF THE INVENTION

1. Field of the Invention

This invention relates to the enhancement of combustion efficiency in an internal combustion engine by charging a mini-combustion chamber with a combustible fuel-air mixture during the compression stroke, by issuing a hot gas jet from a mini-combustion chamber into the main combustion chamber during the combustion stroke and then clearing or purging the mini-combustion chamber of burned gases by providing a closable passage for drawing ambient air through the mini-combustion chamber during the intake stroke.

2. Description of the Prior Art

Various efforts have been made over the years to improve the ignition process in internal combustion engines by providing mini-combustion chambers communicating with the spark gap region of a spark plug from which ignition propagates into the main combustion chamber. The purpose of such mini-combustion chambers is to provide a jet of hot gases which propagates into the main combustion chamber at a higher velocity than the propagation velocity of the flame front from the spark plug. The higher the jet propagation velocity, the more complete the combustion in the main combustion chamber. Such prior efforts have been directed to an overall design of the spark plug itself or to adapters which include a mini-combustion chamber in communication with the main combustion chamber. However, no provision has been made for purging or flushing the burned gases from the mini-combustion chamber with ambient air.

For example, U.S. Pat. No. 1,359,591 to Grimes is directed to a spark plug having a hollow shell which forms a firing chamber. When the spark plug discharges or sparks, the fuel-air mixture contained in the hollow shell firing chamber is ignited and expelled as a jet through a restricted passage into the combustion chamber of the engine cylinder to effect ignition of the fuel charge in the cylinder. The shell is described as being frustoconical and having the restricted passage located at the cone apex. The hollow shell firing chamber may be formed integrally with the spark plug or may be provided as a threaded adapter to which a conventional spark plug is engaged. The adapter is threaded to engage a spark plug port of an internal combustion engine. This patent does not provide for purging by ambient air of burned gases contained in the firing chamber.

U.S. Pat. No. 1,522,551 to Shepherd is directed to an adapter threaded to receive a spark plug and also threaded to engage a spark plug port of an internal combustion engine. The adapter is formed to provide an ignition chamber in the region of the spark plug gap. A Venturi-shaped throat provides a passage which communicates with the cylinder combustion chamber. The Venturi throat, in the region diverging in the direction away from the ignition chamber, is roughened or corrugated so as to prevent oil or other contaminants from entering the ignition chamber. In the region converging in the direction away from the ignition chamber, the Venturi throat is smooth. The Venturi throat can be made of porous materials which absorb oils. The function of this Venturi throat is not directed to enhancing jet flow velocity since the roughened walls tend to decelerate the flow. In one embodiment, the electrodes forming the spark gap are extended such that the spark gap is located downstream of the Venturi outlet. The extended portions of the electrodes act as spoilers and hinder penetration of the jet into the main combustion chamber. In addition, this patent does not provide for means to purge with ambient air burned gases from the ignition chamber.

U.S. Pat. No. 4,182,281 to Heintzelman is directed to a spark plug adapter having a preliminary combustion chamber divided into a wider upper portion and a narrower lower portion. The preliminary combustion chamber has a restricted opening for communicating with the cylinder combustion chamber. The restricted opening has a knife edge therein and can either be diverging in the direction away from the preliminary combustion chamber or converging-diverging in the direction away from the preliminary combustion chamber. A helically-shaped insert having a cross member and located within the lower portion of the preliminary combustion chamber promotes turbulence of the jet expelled from the preliminary combustion chamber through the restricted opening. The insert has no opening because the flow is subsonic, allowing any disturbance to wash out at the speed of sound. In addition, this patent does not contemplate the purging of burned gases from the preliminary combustion chamber.

U.S. Pat. No. 4,499,399 to Flores is directed to a spark plug adapter provided with an upper preliminary chamber in the region of the spark gap connected by an acceleration orifice to a lower chamber. A deflector is disposed beneath the exit of the lower chamber so as to promote turbulence in the exiting ignited fuel mixture. The upper chamber is shown to converge toward the acceleration orifice. External fins are provided to cool the upper chamber. Because of the apparent ratio of the length to diameter, the acceleration orifice and the lower chamber function only to slow the flow velocity and increase heat loss from the jet. The deflection element further impedes the resulting jet velocity. This design also fails to purge burned gases from the preliminary combustion chamber with ambient air.

U.S. Pat. No. 3,710,764 to Jozlin is directed to an integral spark plug or a spark plug adapter having an ignition chamber communicating with an exit port. A one-way valve is disposed between the ignition chamber and exit port. One or more relatively small jet passages are provided to permit expulsion of a jet of burning gas through the port into the engine combustion chamber. Various valve and jet passage arrangements are disclosed. The purpose of the valve is to permit buildup of pressure during ignition in the ignition chamber surrounding the spark gap. However, because these passages are small in diameter and have a large aspect ratio of length to diameter, they slow the flow to low speed. In addition, these passages tend to cool the jet gases, and no means are provided to purge burned gases from the ignition chamber.

In view of the foregoing limitations and shortcomings of the prior art devices, as well as other disadvantages not specifically mentioned above, it should be apparent that there still exists a need in the art for a device for issuing a high velocity jet into a combustion chamber. In addition, there is no provision made in the Patents discussed above for purging the mini-combustion chamber of burned gases with ambient air.

SUMMARY OF THE INVENTION

The present invention provides a means for improving the thermal efficiency of an internal combustion engine by incorporating a hot gas jet ignition system. The hot, high velocity gas jet generated by the system promotes rapid combustion and helps to insure thorough combustion of the fuel-air mixture. The invention accomplishes this by providing a spark plug or spark plug/adapter assembly with a mini-combustion chamber having an outlet nozzle. As the engine cycles into and through the combustion phase of operation, a hot, high velocity gaseous jet issues from the mini-combustion chamber and penetrates deep into the combustion chamber of the engine to ignite the main fuel-air mixture. The burned gases in the mini-combustion chamber are then purged by ambient air flow through an air inlet check valve during the next intake phase of the associated internal combustion engine cylinder or combustion chamber.

Several embodiments of a mini-combustion chamber are disclosed in which the chamber has an outlet nozzle for issuing a jet of hot gases into the combustion chamber during the combustion stroke or phase and communicates with the atmosphere through an air inlet check valve to permit purging of burned gases during the intake stroke or phase of the engine. A first embodiment of the invention is directed to an adapter which has female threads for receiving a conventional spark plug and male threads for engaging a conventional spark plug port in an engine cylinder head. Disposed within the wall of the adapter is an air inlet having a check valve which is open during the intake stroke for providing ambient air to purge the mini-combustion chamber. A nozzle is provided in the passage which leads from the mini-combustion chamber into the main combustion chamber.

A second embodiment of the invention is directed to a spark plug having an extended spark plug tip electrode portion, with a mini-combustion chamber formed as part of the spark plug and having an air inlet with a check valve for communicating with the atmosphere built into a wall of the chamber, with the ground or discharge electrode disposed in the mini-combustion chamber wall. A nozzle is provided as in the other embodiments.

A third embodiment of a check valve is disclosed in which a ball check valve is disposed in the wall of an adapter or spark plug.

With the foregoing and other advantages and features of the invention that will become hereinafter apparent, the nature of the invention may be more clearly understood by reference to the following detailed description of the invention, the appended claims and to the several views illustrated in the drawings.

BRIEF DESCRIPTION OF THE DRAWING

FIG. 3b is an end view of the inlet port of the check valve embodiment of FIG. 3a.

DETAILED DESCRIPTION OF THE INVENTION

Figure 1:
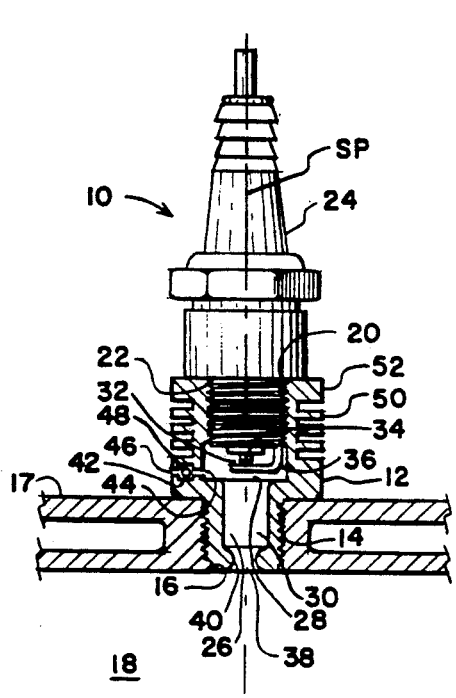
FIG. 1 is a side elevation view, partly in cross-section, of a spark plug and adapter having a mini-combustion chamber and a check valve according to a first embodiment of the invention.

Referring now in detail to the drawings wherein like parts are designated by like reference numerals throughout, there is illustrated in FIG. 1 a first embodiment of a spark plug/adapter assembly according to the invention which is designated generally by the numeral 10. Assembly 10 comprises an adapter 12 provided with male threads 14 for threadably engaging a spark plug port 16 of the cylinder head 17 of an internal combustion engine cylinder or combustion chamber 18. Adapter 12 is also provided with female threaded bore 20 for engaging the male threads 22 of a conventional spark plug 24. The combination of spark plug 24 and adapter 12 are intended to fit into the spark plug port 16 in substantially the same manner as a conventional spark plug. Adapter 12 is formed of conventional materials known in the art and compatible with internal combustion engine processes to provide a mini-combustion chamber 26.

As shown in FIG. 1, a mini-combustion chamber 26 is divided into an upper chamber portion 28 and a lower chamber portion 30. Upper chamber portion 28 houses spark plug gap 32 formed by spark plug tip electrode 34 and spark plug discharge or ground electrode 36. Lower chamber portion 30 has an outlet 38 communicating with combustion chamber 18. The mini-combustion chamber 26 and nozzle 40 (as well as the other mini-combustion chamber and nozzle embodiments discussed hereinafter) may be in the form of a surface of revolution about the longitudinal axis SP and hence have a circular cross-section cut by any plane perpendicular to the axis SP. An air inlet check valve 42 is provided in the wall of adapter 12. Check valve 42 has an internal port 44 communicating with upper chamber portion 28 of mini-combustion chamber 26 and an external port 46 communicating with the engine ambient environment or atmosphere. Disposed between internal port 44 and external port 46 is a check valve ball 48. The ball 48 and check valve 42 are made of conventional materials known in the art and compatible with internal combustion engine processes. The details and operation of the check valve 42 are further discussed hereinafter.

Cooling fins 50, either circumferential as shown, or radial, are provided on the exterior surface of adapter 12. In addition, adapter 12 has a hexagonal or other polygonal cross-section 52 to facilitate installation and removal of adapter 12 in spark plug port 16 by means of a conventional wrench. Conventional metal-to-metal sealing washers (not shown) are preferably provided between the spark plug 24 and adapter 12 and between adapter 12 and cylinder head 17.

Figure 2:
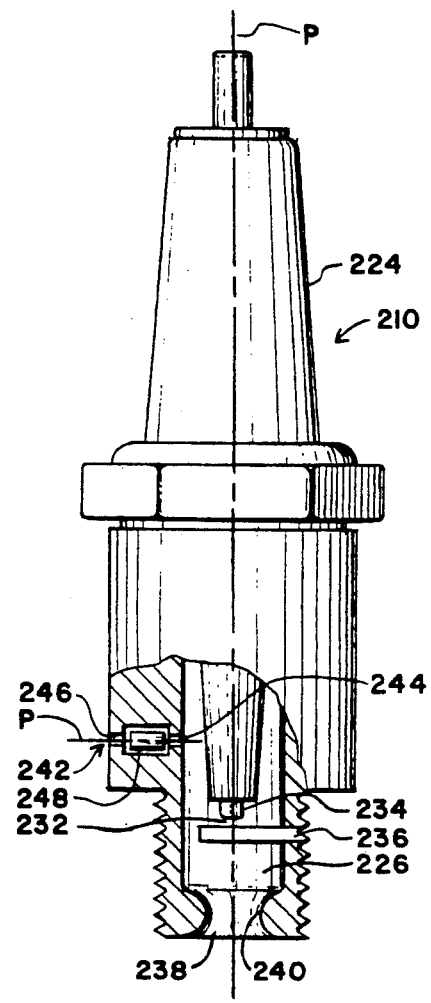
FIG. 2 is a side elevation view, in fragmentary cross-section, of a spark plug having a mini-combustion chamber, a check valve and a discharge electrode, according to a second embodiment of the invention.

FIG. 2 illustrates a second embodiment 210 of the invention, with elements corresponding to those of the first embodiment designated by the same numerals incremented by 200, in which the mini-combustion chamber 226 is integrally formed in a spark plug 224 and encloses an elongated spark plug tip electrode 234. The check valve 242 and ports 244, 246 are provided in the wall of the spark plug 224 and the discharge electrode 236 extends radially into the mini-combustion chamber 226 from the wall thereof. The spark plug gap 232 is preferably located beneath check valve 242. Nozzle 240 is formed as a converging-diverging passage with a semicircular cross-section. The configuration of this embodiment serves the purpose of increasing heat transfer from the spark plug 224 to the cylinder head wall.

Figure 3A:
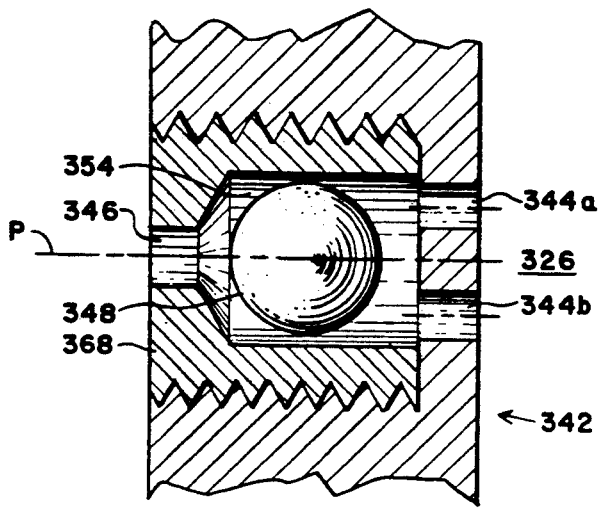
FIG. 3a is a cross-sectional detail of a third embodiment of the check valve of the invention.
Figure 3B:
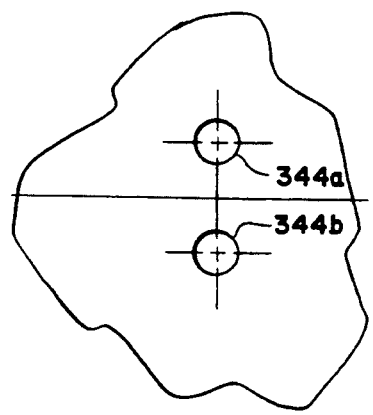

An embodiment of check valve 342 is shown in FIG. 3a, with the internal port holes 344a and 344b. A ball 348 is movably disposed in passage 354. The dimensions of ball 348 and the size and alignment of ball 348 and the size and alignment of outlet port 346 are such that, upon the pressurization of the mini-combustion chamber 326, outlet port 346 is closed by ball 348. However, when mini-combustion chamber 326 is at atmospheric or subatmospheric conditions, outlet port 346 and inlet ports 344a and 344b remain open. It will be appreciated that inlet ports 344a and 344b are offset from the ball center and the axis of passage 354 such that ball 348 cannot close inlet ports 344a and 344b. This embodiment is made by providing a hole in the wall of the adapter/spark plug. Holes 344a and 344b are then formed, as by drilling or otherwise, as known in the art. The larger hole is then threaded and a threaded plug having outlet port 346 formed therein is threadably inserted in the wall of the adapter/spark plug. Passageway 354 is tapered at the outlet port 346 end to provide a seat for ball 348. Besides providing a threaded fitting, as shown, other means of fitting the check valve in the wall of the adapter/spark plug are comtemplated.

It is contemplated that other conventional means for providing check valve flow in one direction may also be used.

The operation of the invention is described with reference to the first embodiment, but is the same for each of the embodiments, as follows: During the intake stroke, check valve 42 is open because the pressure is greater outside the cylinder than inside the cylinder, and hence the cylinder pressure can be characterized as subatmospheric. Thus, in addition to the fuel-air mixture being drawn in through the intake valve or otherwise introduced into the cylinder, check valve 42 is open and ambient air is drawn in through external port 46, through cavity 54 past ball 48, through internal port 44 of check valve 42 and into mini-combustion chamber 26. This ambient air is also drawn into the combustion chamber 18 of the cylinder, thus purging any remaining burned/unburned gases in the mini-combustion chamber 26 from the previous combustion stroke.

During the compression stroke, the fuel-air mixture is compressed, resulting in some of the fuel-air mixture flowing into mini-combustion chamber 26. This compressed fuel-air mixture flows into internal port 46 of check valve 42 and impinges on the relief surface of end face 60 of ball 48 and forces ball 48 against external port 46, thus seating and closing check valve 42. Mini-combustion chamber 26 is thus charged with a compressed fuel-air mixture, a check valve 42 is closed.

During the combustion stroke, an electric potential is applied to spark plug 24, resulting in an electric discharge or spark between electrodes 34 and 36 which define spark gap 32. This results in ignition of the fuel-air mixture in the mini-combustion chamber 26. This ignited fuel-air mixture is a hot gas having a higher pressure than the fuel-air mixture in the main combustion chamber 18. As a result, a jet of ignited hot gas issues from the mini-combustion chamber 26 through nozzle 40 and into the main combustion chamber 18. Mini-combustion chamber 26 and nozzle 40 thus create a jet of hot gas which propagates through the fuel-air mixture in the main combustion chamber 18 at a velocity exceeding the flame front propagation velocity created by the spark across gap 32. As a consequence, the fuel-air mixture in the main combustion chamber is ignited more rapidly and burns more completely than if ignited merely by the propagation of a flame front from spark gap 32.

During the exhaust stroke, check valve 42 is closed in the same manner as during the compression stroke and the mini-combustion chamber 26 again fills with a mixture of burned and unburned gases which are purged as described above during the following intake stroke.

An example of operating conditions is described below. Data, formula and other information and assumptions known in the art are found in the following references.

Ref. A—Internal Combustion Engines, Analysis and Practice, B. Jennings and E. Obert, 1944.

Ref. B—Internal Combustion Engines, 1st ed., L. Lichty, 1939.

Ref. C.—Introduction to Theoretical Gas Dynamics, R. Sauer, 1947.

The pressure, temperature, and other conditions for this example are determined by referring to these references.

flame velocity = 150 ft/sec at 1800 rpm
(extrapolation of FIG. 109, page 222, Ref. A)
compression pressure prior to firing = 151 psi at 6:1 compression ratio
(FIG. 107, page 195, Ref. B)
compression pressure at ignition = 780 psi at 6:1 compression ratio compression temperature = 5000° R. (Ref. A, page 243)
pressure in nozzle region = 429 psi (Ref. C, page 9, K = 1.4 = adiabatic index)
temperature in nozzle region = 4348° R.
jet velocity at nozzle exit region = 3100 ft/sec Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. A device for enhancing combustion in a combustion chamber of an internal combustion engine, comprising a mini-combustion chamber disposed about a spark gap region of a spark plug for receiving a fuel-air mixture from said combustion chamber, and for ignition of said fuel-air mixture upon discharge of said spark plug, means for communicating said mini-combustion chamber with ambient atmosphere when said combustion chamber is at subatmospheric pressure for purging said mini-combustion chamber of burned and unburned gases, and a nozzle disposed between said combustion chamber and said mini-combustion chamber, said nozzle shaped and adapted to expel a high velocity jet of an ignited fuel-air mixture into said combustion chamber following ignition of the fuel-air mixture in said mini-combustion chamber.

2. A device for enhancing combustion in a combustion chamber of an internal combustion engine comprising:
an adapter threaded to receive a conventional spark plug and threaded to be received by a spark plug port in the internal combustion engine;
a mini-combustion chamber formed in said adapter, said mini-combustion chamber disposed about a spark gap region of said spark plug and adapted to receive a fuel-air mixture from said combustion chamber and for ignition of said fuel-air mixture upon discharge of said spark plug; and a check valve disposed in said adapter, said check valve permitting communication of said mini-combustion chamber with ambient atmosphere when said combustion chamber is at subatmospheric conditions for purging said mini-combustion chamber of burned and unburned gases, and a nozzle disposed between said mini-combustion chamber and said combustion chamber, said nozzle shaped and adapted to expel a high velocity jet of ignited fuel-air mixture into said combustion chamber following ignition of the fuel-air mixture in said mini-combustion chamber.

3. A device as in claim 2 wherein said check valve comprises an internal port communicating with said mini-combustion chamber, an external port communicating with ambient atmosphere, a passage disposed between said internal and external ports, and a plunger movable within said passage for closing said external port.

4. A device as in claim 2, wherein said spark plug has a ground electrode formed in a wall of said adapter.

5. A device as in claim 2 wherein said check valve comprises an internal port communicating with said mini-combustion chamber, an external port communicating with ambient atmosphere, a passage disposed between said internal and external ports, and a ball member movable within said passage for closing said external port.

6. A device for enhancing combustion in a combustion chamber of an internal combustion engine comprising:

a spark plug threaded to be received by a spark plug port in the internal combustion engine;

a mini-combustion chamber formed integral with said spark plug, said mini-combustion chamber disposed about a spark gap region of said spark plug port and adapted to receive a fuel-air mixture for ignition of said fuel-air mixture upon discharge of said spark plug;

a ground electrode disposed in a wall of said mini-combustion chamber; and a check valve disposed in said spark plug, said check valve permitting communication of said mini-combustion chamber with ambient atmosphere when said combustion chamber is at subatmospheric condition.

7. A device as in claim 6, wherein said check valve comprises an internal port communicating with said mini-combustion chamber, an external port communicating with ambient atmosphere, a passage disposed between said internal port and said external port and a ball member movable within said passage for closing said external port.

8. A device for enhancing combustion in a combustion chamber of an internal combustion engine, comprising a mini-combustion chamber disposed about spark gap region of a spark plug for receiving a fuel-air mixture from said combustion chamber, and for ignition of said fuel-air mixture upon discharge of said spark plug, and a nozzle disposed between said combustion chamber and said mini-combustion chamber, said nozzle adapted to expel a supersonic velocity jet of an ignited fuel-air mixture into said combustion chamber following ignition of the fuel-air mixture in said mini-combustion chamber.

* * * * *